(12) United States Patent
Thibadeau (10) Patent No.: US 7,631,198 B2
(45) Date of Patent: Dec. 8, 2009

(54) PROTOCOL SCRIPTING LANGUAGE FOR SAFE EXECUTION IN EMBEDDED SYSTEM

(75) Inventor: Robert Thibadeau, Pittsburgh, PA (US)

(73) Assignee: Seagate Technology, Scotts Valley, CA (US)

( * ) Notice: Subject to any disclaimer, the term of this patent is extended or adjusted under 35 U.S.C. 154(b) by 803 days.

(21) Appl. No.: 11/125,861

(22) Filed: May 10, 2005

(65) Prior Publication Data
US 2006/0259895 A1 Nov. 16, 2006

(51) Int. Cl.
| G06F 11/30 | (2006.01) |
| G06F 15/16 | (2006.01) |
| G06F 15/173 | (2006.01) |
| G06F 9/44 | (2006.01) |
| G06F 9/45 | (2006.01) |
| G06F 3/14 | (2006.01) |
| G06F 17/30 | (2006.01) |
| G07F 7/10 | (2006.01) |
| H04M 1/00 | (2006.01) |
| H04M 3/00 | (2006.01) |

(52) U.S. Cl. .................. 713/193; 709/223; 709/229; 717/115; 717/139

(58) Field of Classification Search .................. 713/193
See application file for complete search history.

(56) References Cited

U.S. PATENT DOCUMENTS

| 4,945,468 A | 7/1990 | Carson et al. ............... 364/200 |
| 5,713,018 A | 1/1998 | Chan .......................... 395/610 |
| 5,781,550 A | 7/1998 | Templin et al. ............. 370/401 |
| 5,825,877 A | 10/1998 | Dan et al. ...................... 380/4 |
| 5,841,871 A | 11/1998 | Pinkas ......................... 380/25 |
| 5,937,159 A | 8/1999 | Meyers et al. .......... 395/187.01 |
| 6,212,636 B1 | 4/2001 | Boyle et al. ................. 713/168 |
| 6,295,518 B1 * | 9/2001 | McLain et al. .............. 709/223 |
| 6,321,337 B1 | 11/2001 | Reshef et al. ............... 713/201 |
| 6,324,650 B1 | 11/2001 | Ogilvie ....................... 713/202 |
| 6,367,012 B1 | 4/2002 | Atkinson et al. ............ 713/176 |

(Continued)

FOREIGN PATENT DOCUMENTS

WO WO 9718661 A1 * 5/1997

OTHER PUBLICATIONS

S. Papadimitriou; "Scientific programming with Java classes supported with a scripting interpreter", Software IET, vol. 1, Issue 2, Apr. 2007, pp. 48-56.*

Primary Examiner—Matthew B Smithers
Assistant Examiner—Courtney D Fields
(74) Attorney, Agent, or Firm—Westman, Champlin & Kelly, P.A.

(57) ABSTRACT

A storage device with hardened security features for safe execution of scripts has a storage medium, an interface, a set of safe commands, and a script interpreter. The interface is adapted to communicatively couple the storage device to a host system and to transport interface commands and information between the host system and the storage device. The set of safe commands is stored on the storage medium. The script interpreter is disposed within the storage device for processing scripts based on one or more received interface commands. The script interpreter is adapted to enforce a strict ordering of script execution and to terminate script execution and roll back any changes associated with the script execution if an interface command invokes a script in violation of the strict ordering.

19 Claims, 7 Drawing Sheets

U.S. PATENT DOCUMENTS

| | | | |
|---|---|---|---|
| 6,473,791 B1 | 10/2002 | Al-Ghosein et al. | 709/217 |
| 6,546,487 B1 | 4/2003 | McManis | 713/169 |
| 6,829,704 B2 | 12/2004 | Zhang et al. | 713/1 |
| 6,829,707 B1 | 12/2004 | Marshall et al. | 713/150 |
| 6,829,712 B1 | 12/2004 | Madoukh | 713/200 |
| 6,880,083 B1 | 4/2005 | Korn | 713/170 |
| 6,883,098 B1 | 4/2005 | Roman et al. | 713/200 |

\* cited by examiner

PROTOCOL SCRIPTING LANGUAGE FOR SAFE EXECUTION IN EMBEDDED SYSTEM

CROSS-REFERENCE TO RELATED APPLICATION

None.

FIELD OF THE INVENTION

The present invention relates to scripts that execute on storage devices, and more particularly, to a methodology for controlling execution of scripts or programming language in a microprocessor embedded in the storage device.

BACKGROUND OF THE INVENTION

Disc drive and other storage subsystems, including flash memory devices and removable storage devices, typically have a processor (sometimes called a microprocessor) in their built-in electronics. The processor can be used to hide computations as well as stored data. In many security applications, and in many applications where an application provider may wish to guard against fraudulent use of applications or content, it may be desirable to perform certain computations in a hidden way. This includes hiding keys that may be employed to unlock an asset through a cryptographic proof or through simple knowledge of a shared secret. Performing computations in a hidden way may also include hiding certain computations that may be employed to allow software or content external to the storage device to operate desirably. Unlike conventional read/write commands, security commands are typically provided within the context of a protocol that stipulates that a particular sequence of messages must be exchanged between the storage device and the host according to strictly defined partial ordering constraints. Digital Rights Management and other content protection protocols are of this form. Read/Write commands are monolithic in themselves, while protocols are monolithic only if a strict sequence is completed without error or intervention.

A convenient and general way to perform such hidden and well-defined calculations and computations is through scripting or programming languages that execute on the storage device processor. A potential disadvantage of allowing an external agent to program the storage device processor is that the external agent can then use this programming capability maliciously. The external agent could impair the storage device's operations with unexpected consequences, either maliciously or accidentally. Embodiments of the present invention provide solutions to these and other problems, and offer other advantages over the prior art.

SUMMARY OF THE INVENTION

A storage device with hardened security features for safe execution of scripts has a storage medium, an interface, a set of safe commands, and a script interpreter. The interface is adapted to communicatively couple the storage device to a host system and to transport interface commands and information between the host system and the storage device. The set of safe commands is stored on the storage medium. The script interpreter is disposed within the storage device for processing scripts based on one or more received interface commands. The script interpreter is adapted to enforce a strict ordering of script execution and to terminate script execution and roll back any changes associated with the script execution if an interface command invokes a script in violation of the strict ordering.

In one embodiment, a method for processing scripts on a processor disposed within a storage subsystem is described. Each script is processed according to a command received over an interface coupling the storage subsystem to a host system. A set a set of safe commands to which the storage subsystem responds is provided on a storage medium within the storage subsystem. A controller within the storage subsystem verifies that each received command matches at least one command in the set of safe commands. Execution of the received command is terminated if the received command does not match one of the commands in the set of commands.

In another embodiment, a script processing system is disposed on a storage device. The storage device has a storage medium and circuitry adapted to read and write data to and from the storage medium, and is coupled to a host system via an interface. A set of allowed commands defines a strict set of input command expectations. The set of allowed commands includes interface commands and internal functions. A script interpreter is adapted to execute scripts and to enforce the strict set of input command expectations based on the set of allowed commands. The script interpreter is adapted to terminate script execution if an input command expectation is violated.

Other features and benefits that characterize embodiments of the present invention will be apparent upon reading the following detailed description and review of the associated drawings.

DETAILED DESCRIPTION OF ILLUSTRATIVE EMBODIMENTS

Figure 1:
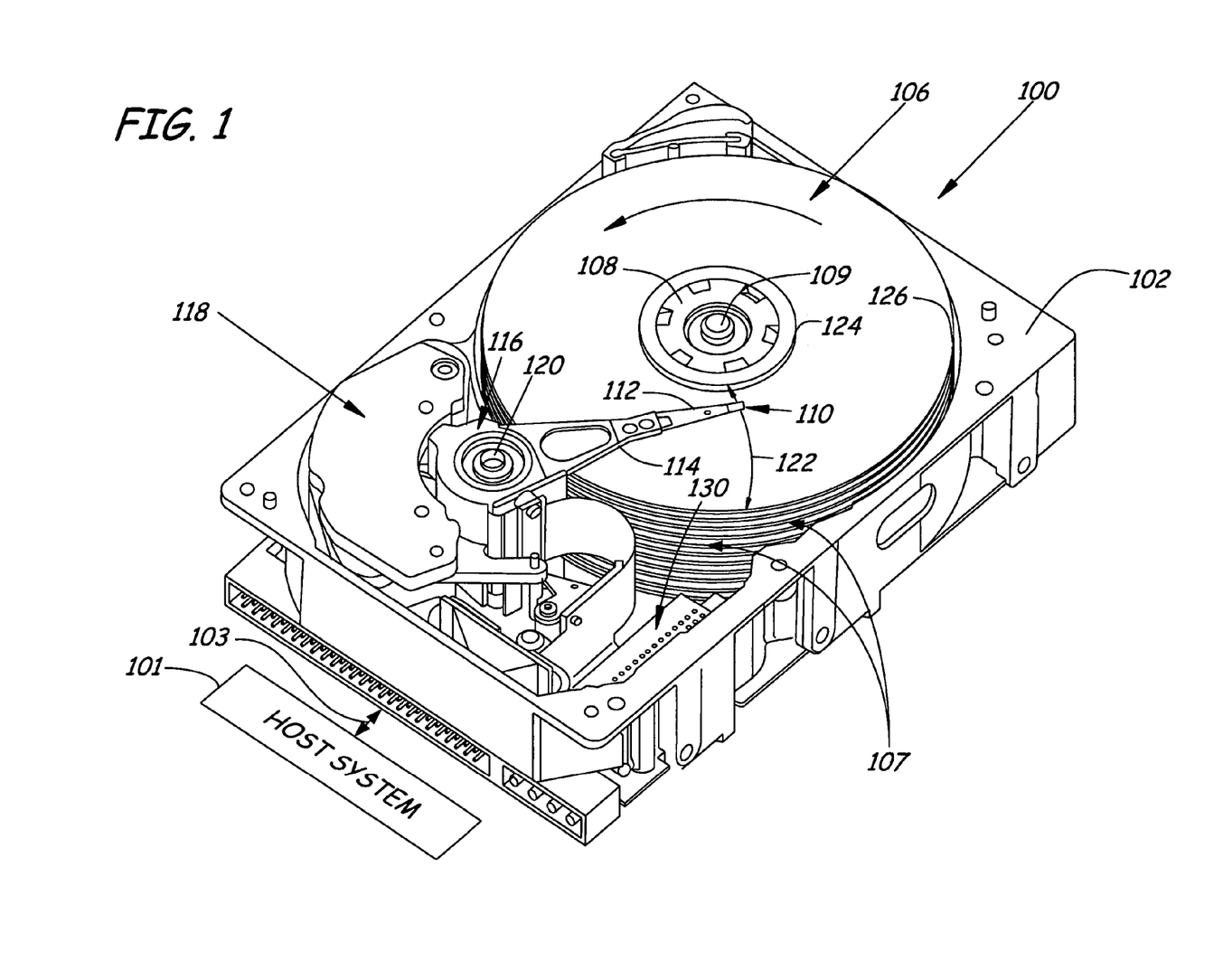
FIG. 1 is an isometric view of a disc drive.

FIG. 1 is an isometric view of a disc drive 100 in which embodiments of the present invention are useful. Disc drive 100 includes a housing with a base 102 and a top cover (not shown). Disc drive 100 further includes a disc pack 106, which is mounted on a spindle motor (not shown) by a disc clamp 108. Disc pack 106 includes a plurality of individual discs, which are mounted for co-rotation about central axis 109. Each disc surface has an associated disc head slider 110 which is mounted to disc drive 100 for communication with the disc surface.

In the example shown in FIG. 1, sliders 110 are supported by suspensions 112 which are in turn attached to track accessing arms 114 of an actuator 116. The actuator shown in FIG. 1 is of the type known as a rotary moving coil actuator and includes a voice coil motor (VCM), shown generally at 118. Voice coil motor 118 rotates actuator 116 with its attached heads 110 about a pivot shaft 120 to position heads disposed on the sliders 110 over a desired data track along an arcuate path 122 between a disc inner diameter 124 and a disc outer diameter 126. Voice coil motor 118 is driven by servo electronics 130 based on signals generated by heads on the sliders 110 and a host system 101 over interface 103.

It should be understood by a worker skilled in the art that the embodiment shown in FIG. 1 is one possible storage system on which the present invention may be implemented. The present invention for controlling drive-side script execution may also be implemented on any storage subsystem having a microprocessor. The term "script" as used herein refers to an ordered set of commands and related information, which may alter data, access peripheral devices, or otherwise perform a function. A drive-side or device-side script is a script that is executed using the embedded electronics of the storage device.

In general, the present invention provides a means for allowing programmers to write scripts that are processed by the storage device via a microprocessor in the storage device, while providing protection against macro-type viruses. The present invention makes use of a script interpreter within the storage device. The script interpreter is configured or adapted to accept pre-determined commands received over the interface. It is assumed that as long as such commands are known and as long as such commands are properly constrained, then the commands can be assumed to be safe. As used herein, the term "command" refers to a "wait until completion", ATA or SCSI type command received by the storage device over the interface that is known in the art.

Commands available to the script are only available via calls across the interface. The only accepted commands are function calls that are handed across the interface, and any other type of command is rejected by the script interpreter. A function cannot be called at all unless it is previously defined in a set of "safe" commands on the storage device. Moreover, a function cannot be called in an unexpected order or the script interpreter will reject the function call and roll back any changes initiated by the script execution to its original state.

The script (ordered sequence of commands and information) defines a strict partially ordered set. If a command is ever transmitted over the interface that violates the strict partial ordering, then the entire script is aborted and the system rolls back any script-related changes to return the storage device to its former state. In other words, the system rolls back the changes so that it is as if the script never started.

Beyond strict partial ordering of external commands, permitted commands may also include conditional testing-related commands, so that the storage device can make conditional branches based on its own internal tests. These tests include things like taking output of an external command, testing to see if the output equals or is greater than some value, then making conditional branches to partial ordering based on that output. In this manner, the script can be utilized to answer, for example, a "yes/no" type question completely internally, and branch on the result.

Figure 2:
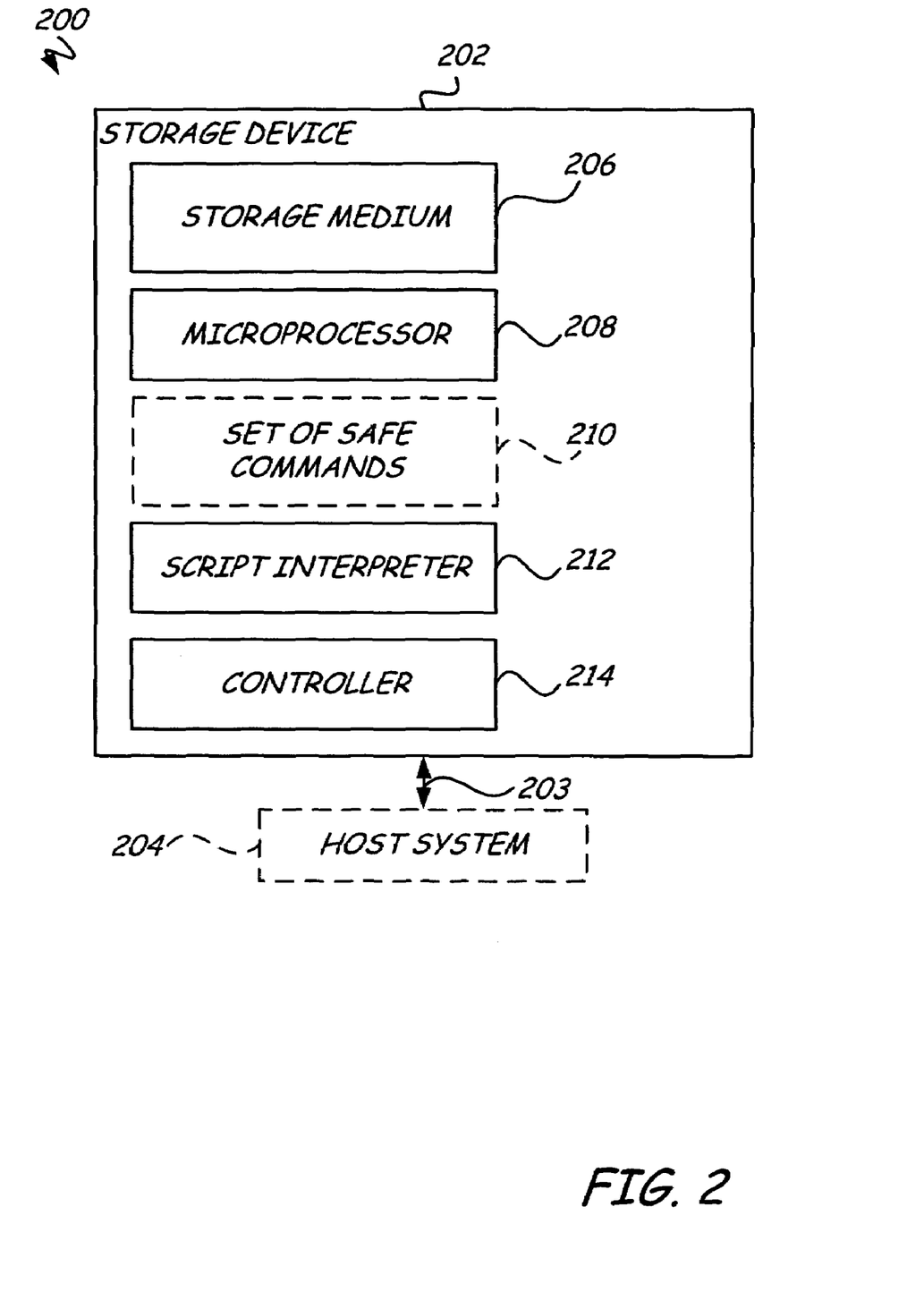
FIG. 2 is a simplified block diagram of a system implemented according to an embodiment of the present invention.

FIG. 2 is a simplified block diagram of a system 200 implemented according to an embodiment of the present invention. The system 200 includes a storage device 202 and a host system 204, which are communicatively coupled by interface 203. The storage system 202 may be a disc drive, a removable or fixed storage subsystem, a flash memory disc, MRAM, EEPROM or any other storage system. The host system 204 may be a computer with an operating system and a SCSI or ATA bus for coupling via interface 203 with the storage system 202.

Generally, the storage device 202 includes a storage medium 206, a microprocessor 208, a set of commands 210, a script interpreter 212 (a runtime or set of command execution rules), and a controller 214. Generally, the microprocessor 208 is adapted to perform computations and to process scripts and programs via the script interpreter 212 (or runtime), independent from any processing performed by a host system 204. The set of commands 210 are pre-defined commands which can be characterized as being safe in the sense that they have known outputs and that they process in ways that are known to be deterministic. The set of commands 210 may be stored in firmware of the controller 214, on the storage medium 206, or in any other memory location accessible to the controller 214 and secured from unauthorized access. The controller 214 manages communications between the storage medium 206 and the outside world (such as from the host system 204).

It should be understood that the storage device 202 may also serve as a stand-alone storage device. The host 204 is shown in phantom to indicate that in certain circumstances, the host 204 is not required. For example, if the storage device 202 is a stand-alone networked device, the storage device 202 may be connected directly to a network via a standard connector (such as a twisted-pair Ethernet connection, a coaxial network connection, a dial-up network connection and so on). If the storage device 202 is a stand-alone networked device, the storage device 202 may include authentication algorithms for authenticating users and devices to control access to data stored on the storage device 202.

In general, the set of commands 210 represent allowed or permitted commands to which the storage device 202 responds. Moreover, the set of commands 210 may include a permissible command order defining an order in which the script interpreter 212 can execute commands received over the interface 203. A programmer can write scripts to access the set of commands 210 via interface 203 in tightly controlled ways.

A script for processing on the microprocessor 208 of the storage device 202 is composed principally of the set of allowed commands 210. Each command in the script may serve as expected input, as an internally executed command, or as a means for providing an output. A command may be designed to provide input and output, input only, or output only.

In general, the set of safe commands to which the storage device responds is characterized as safe in the sense that each of the safe commands has a known output and executes in ways that are known to be deterministic. A script is composed principally of these safe commands in three roles: 1) as an expected input, 2) as an internally executed command, or 3) as an output generating command. The script itself identifies the expected input commands. The execution of the script on the embedded platform requires that the commands within the script occur in an order that they can be taken by the script and without any intervening commands. If the strict sequence of commands dictated by the script is violated, the entire script is aborted, and the actions taken by the script are "rolled back". In this fashion, a script can be seen to perform a single computation based on multiple inputs. In a preferred embodiment, each command expression returns an assignable value.

In addition to the commands that the device responds to by external instruction, there can also be a set of commands that execute only in the script environment. One such command is a conditional IF-THEN-ELSEIF- . . . -ENDIF command. Other commands or operators include inequality, equality, Boolean, and arithmetic commands or operators. Other programming language abstractions such as types are set to be "safe". The script does not permit direct memory manipulation. Additionally, looping and recursion have upper limits set by default.

It should be understood that a disadvantage of permitting an external agent to program the storage device processor is that the external agent can then use the programming capability to maliciously or accidentally impair operations with possibly unexpected consequences. The present invention introduces a methodology for confining such programming to a tightly controlled sequence of allowable commands, which are executed within a scripting environment. If commands invoked by the script are executed out of expected order or in a sequence different from that dictated by the script, then the processor 208 rolls back all actions taken by the script. Thus, programming of the storage device processor by an external agent is permissible and safe, provided that such programming conforms to the tightly controlled sequence of allowable commands, in part, because command execution is based on a set of allowed commands executed in a controlled order. By this methodology, safe execution of scripts can be guaranteed, in part, because script execution is deterministic.

In one embodiment, the scripts may be conceptualized as managed code, which is code that is developed with a language compiler to target a runtime. Managed code typically provides "metadata" to allow the runtime to locate methods encoded in assembly modules, to store and retrieve security information, to handle exceptions, and so on. Managed code targets a runtime, which manages the code at execution, providing core services such as memory management, thread management, and so on. In an alternative embodiment, the microprocessor 208 executes the script language using a set of execution rules or a script interpreter 212. The script interpreter 212 may also be a runtime for the purpose of processing managed code blocks.

As mentioned above, the methodology of the present invention allows for conditional commands, which are executed only within the script environment. Such conditional commands provide a means for branching based on tests performed by the script within the storage device. Such tests may search and retrieve status or other types of information for various purposes and produce an output based on the retrieved information without revealing the information. One example of this might be in a database within a medical setting. In a medical environment, the database may include information about a patient's date of birth, social security number, and other confidential information. It is generally desirable to protect such information from unauthorized access and inspection, and to prevent such information from being exposed by execution of a command over the interface. The set of allowed interface commands may access local functions and other commands to test if certain types of information are true, but without revealing any data to a user. For instance, a nurse could test to see if a patient record exists. The nurse causes a command to be sent over the interface for verifying a patient record. The command accesses local functions, which allow the system to verify the record internally. Depending on the calling function, after internal verification, the system may direct the nurse to a page for editing information related to the patient's profile without exposing confidential information to the nurse.

One major advantage of the present invention is that complex calculations can be performed entirely internal to the storage device. For example, operations involving an encryption/decryption symmetric key or public-private key pair may require transactions where the key is provided to an authorized device. If the key is unencrypted, this may potentially expose the key to an unauthorized hacker, if the hacker were monitoring the transaction. A command issued over the interface to get the key (such as a "Get Key" command) is captured by the script interpreter, and instead of returning the key unencrypted to the user, with the present invention, the key can be retrieved and encrypted within the storage device by the internal processor of the device without exposing the key. The key or key-pair can be returned to the requesting device over the interface, for example, in an RSA enveloped PKES key. In this way, the storage device can be made to function with a smart card (which requires a key), but without exposing the key to a "Trojan horse" or a spy.

Additionally, it should be understood that the conditional commands permit two or more input commands to be expected simultaneously. In this instance, either command may succeed without the other succeeding. Nevertheless, there remains a strict partial ordering of the commands that the script interpreter 212 will accept. The script itself may be writable to a storage location on the storage medium 206 (or any other storage location) and may be invoked by invoking the content at that memory location. The output of the script may include various device outputs, and may include changes to data stored on the storage medium 206.

Figure 3:
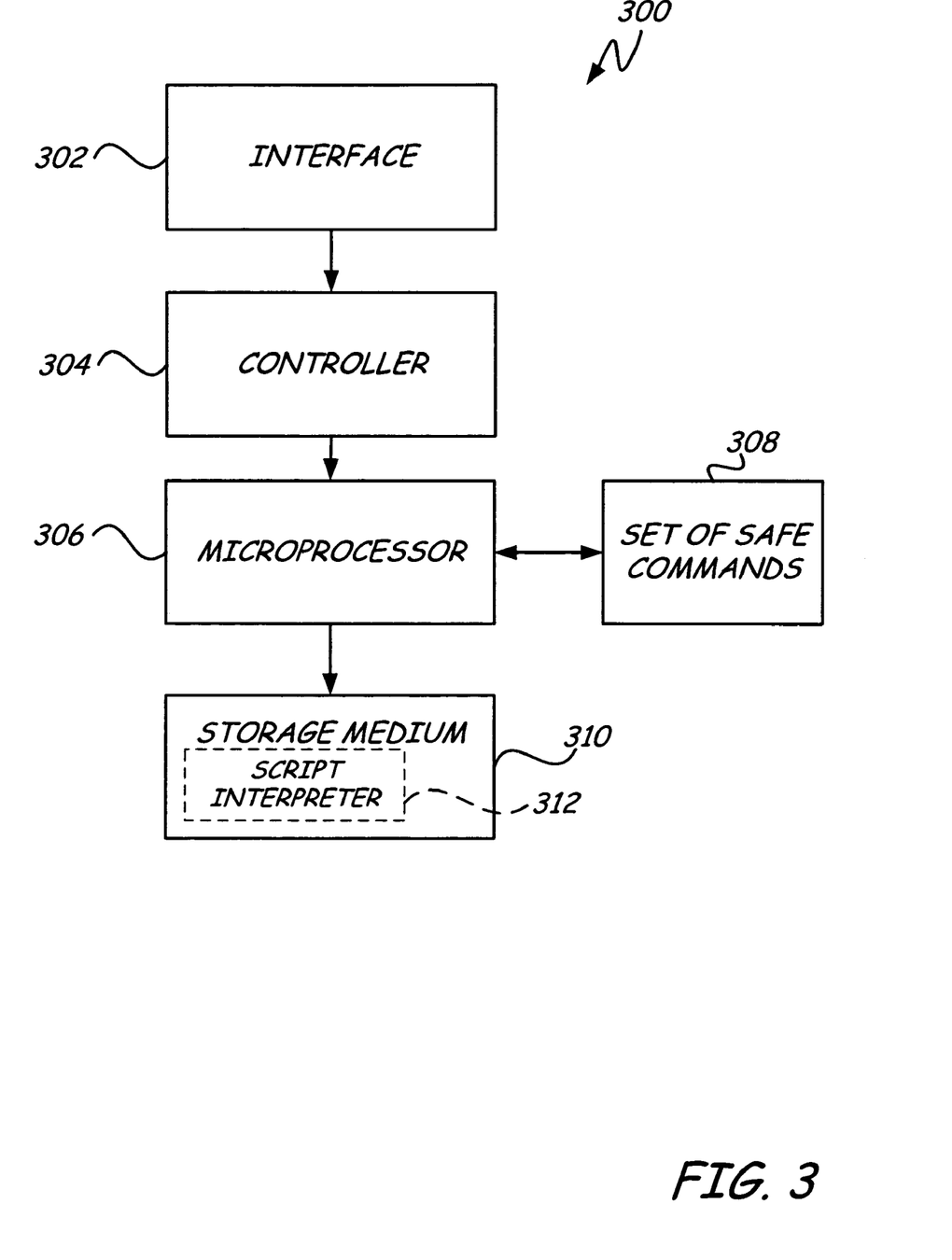
FIG. 3 is a simplified block diagram of a storage subsystem according to an embodiment of the present invention.

FIG. 3 is a simplified block diagram of a storage subsystem 300 according to an embodiment of the present invention. It should be understood by workers skilled in the art that a number of details are omitted from FIG. 3 for the sake of simplifying the discussion, such as the details of the read/write mechanism, including motors, spindles, sliders and the like. The subsystem 300 includes an interface 302, a controller 304, a microprocessor 306, a set of safe (or allowed) commands 308, and a storage medium 310. A script interpreter application 312 is provided on the storage medium 310 and is loaded by the microprocessor 306 as needed to process storage device-side scripts. The interface 302 may be a host interface for communicating directly with a host computer system. Alternatively, the interface 302 may be a network card adapted to connect with a network and to receive commands and expected data over the interface connection.

When a command is received via interface 302, the controller 304 accesses a memory location associated with the command, if the command is contained in the set of safe commands. The command is invoked by accessing a memory location of the storage medium 310 where a script for executing the command is stored. The microprocessor 306 invokes the script interpreter 312 (e.g. loads the script interpreter 312 into memory). The microprocessor 306 uses the script interpreter to process the script. First the script interpreter 312 compare each command to commands in the set of safe (allowable) commands 308. Then, the script interpreter 312 processes the script. If a command is not one of the set of safe commands 308, does not include expected information, or is received in an order that violates an expected ordering, the script execution is terminated and all changes made during script execution are rolled back to a pre-command state.

In general, a script may contain commands that are expected across the interface ("interface commands") as well as other commands (which are referred to herein as "local functions" or "internal functions"). In general, "local functions" or "internal functions" may include data processing commands or operations as well as logical functions that cannot be accessed directly via the interface and that do not return data to the interface. For example, a script is loaded by the microprocessor 306 into the script interpreter 312, based on a command received over interface 302. The script is comprised of a series of functions (Fn1, Fn2, Fn3, . . . , FnN) executed in sequence. Each function may include an expected interface command received over the interface, but some of the functions may include local functions and commands as well. The local commands are preferably contained in the set of safe commands 308. If Fn1 represents a function or logical operation, such as x=1+b where b is an interface command, then an expectation is set for b across the interface 302. If b is a local function or local variable, there is no expectation set for it. It is important, therefore, to understand the difference between interface commands and script operations and local functions.

Generally, it should be understood that a script stored in memory is not necessarily tested by the controller until execution of the script is attempted. Consequently, a script may be loaded to the storage medium 310 over the interface 302. The controller 304 is concerned with execution of the script based on commands received over the interface 302. Consequently, upon accessing the memory location of the script on the storage medium 310, the controller 304 intervenes to make sure that executed functions and commands are safe before allowing the script execution to proceed. If script functions or commands are not safe, as determined by comparison with the pre-determined set of safe commands 308, then the script execution is halted and any changes associated with the execution are undone (rolled back to a pre-script-execution state, which is the state of data and/or settings of the storage device 300 just before the script was accessed).

Figure 4:
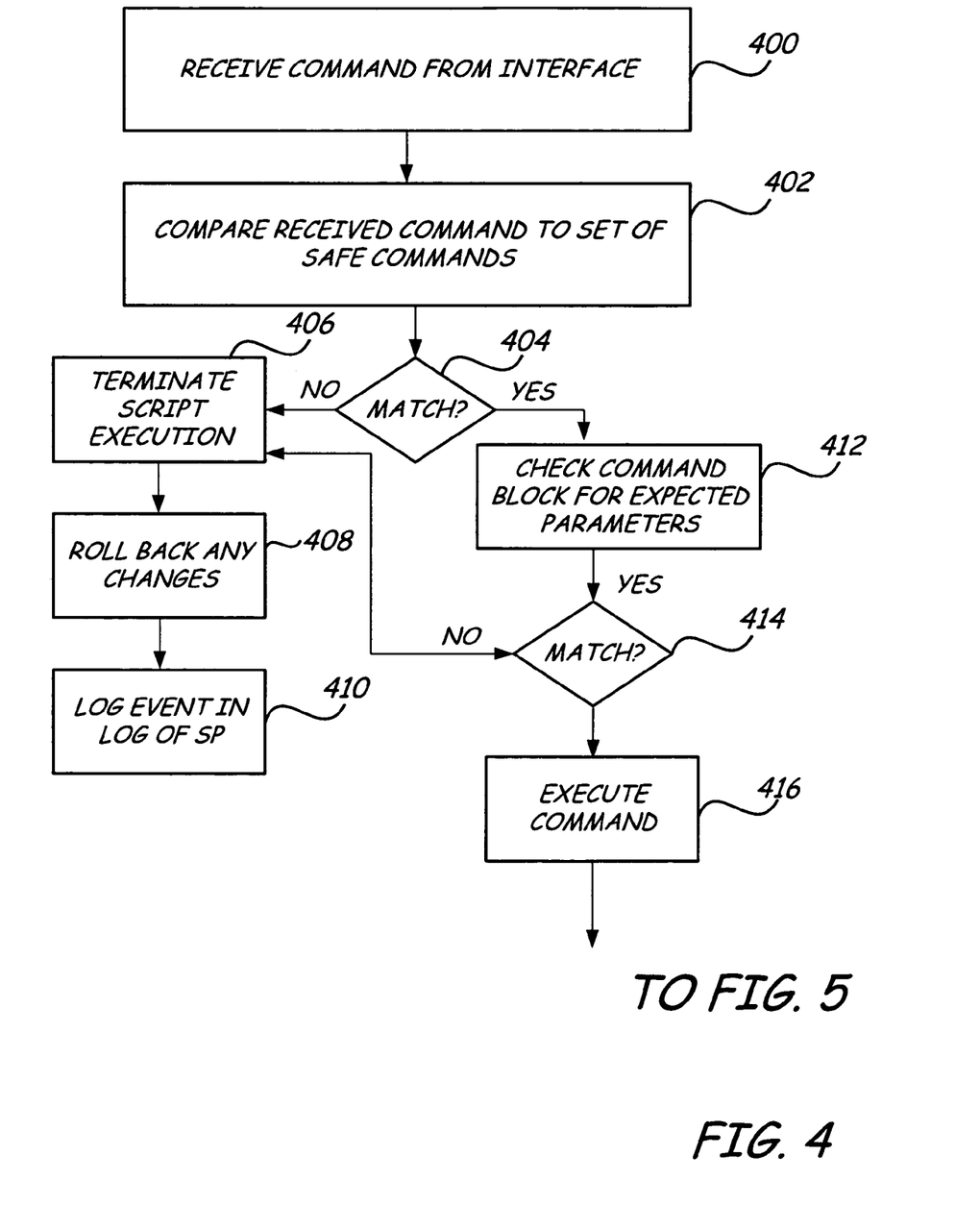
FIG. 4 is a simplified flow diagram of a method for processing commands received over an interface between a host system and a storage device according to an embodiment of the present invention.

FIG. 4 is a simplified flow diagram of a process for controlled execution of a command received over the interface between a host system and a storage device according to an embodiment of the present invention. A command is received from a device over the interface (step 400). The received command is compared by a controller of the storage device to commands contained in the set of safe commands (step 402), which are stored in the storage device. If the received command does not match a command in the set of safe commands (step 404), the script execution is terminated (step 406), any changes caused by the script execution are reversed or rolled back to an original state (step 408), and a log of the event is stored in a security partition (SP) log (step 410).

By contrast, if the received command does match a command in the set of safe commands (step 404), the command is checked for expected parameters (step 412). For example, if the received command invokes a process for checking to see if "Bob is 21", expected parameters for the command would typically include the person's name and today's date. If the received command parameters are absent or do not match the expected parameters (step 414), the script execution is terminated (step 406), any changes caused by the script execution are reversed or rolled back to an original state (step 408), and a log of the event is stored in a security partition (SP) log (step 410). If the parameters match the expected parameters (step 414), the command is executed (step 416).

Typically, a command is executed by a microprocessor within the storage device by accessing a memory location associated with the command. The memory location associated with the command may contain a script, which is then processed by the microprocessor in conjunction with the script interpreter (as shown with respect to FIG. 5).

It should be understood that the above-described process is repeated for each command received over the interface, and for each interface command encountered within a script. An interface command is a command received over the interface or a command that directs information to be sent over the interface from the storage device. By testing each command before execution, the controller verifies that each command is a safe command, and command execution can be tightly confined to the pre-determined list of safe commands. By rolling back all changes from a failed script execution, the system guarantees only safe scripts that follow the scripting language procedures are executed.

Figure 5:
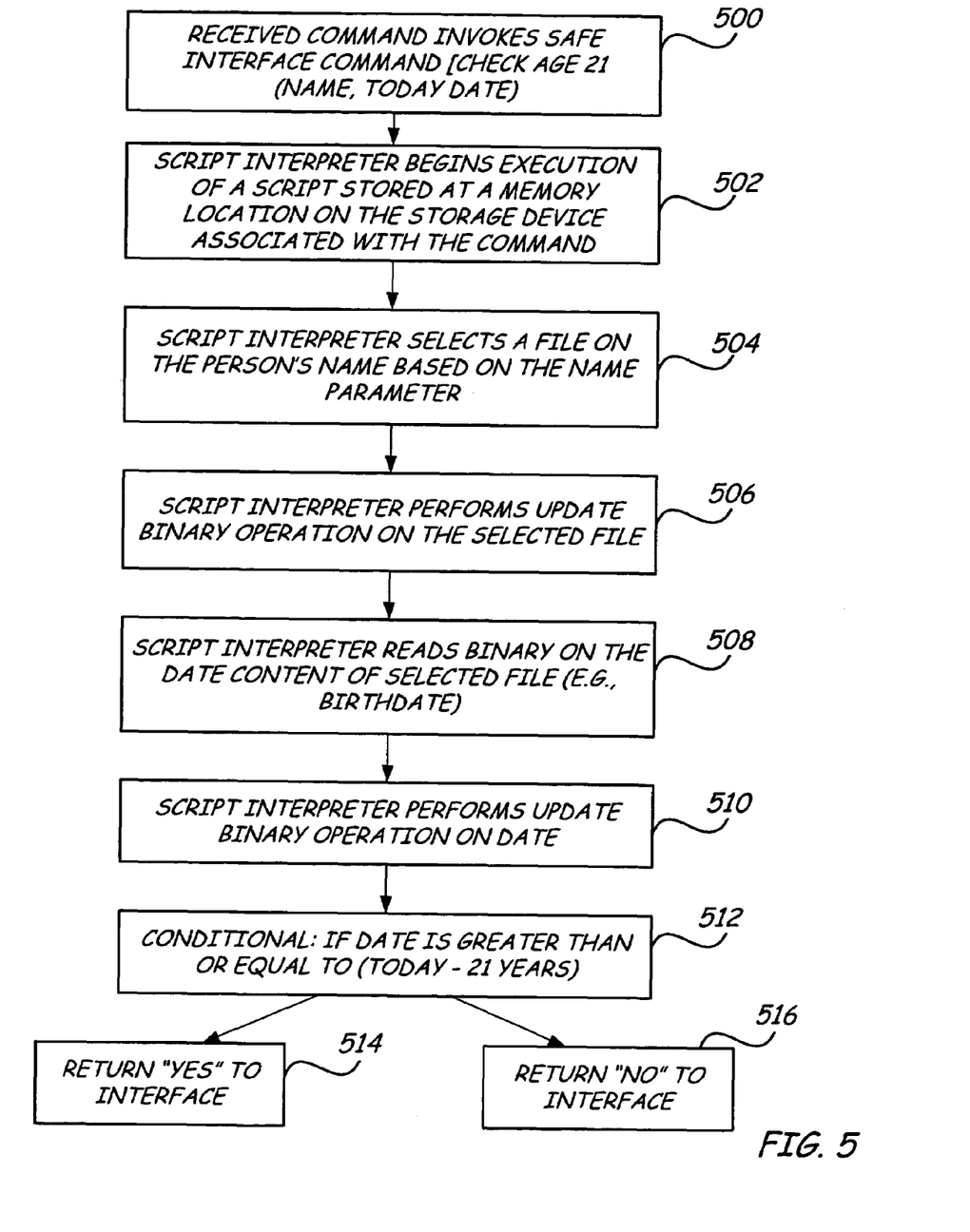
FIG. 5 is a simplified flow diagram of a method for processing a script invoked by a received command on a storage device according to an embodiment of the present invention.

FIG. 5 shows a simplified flow diagram of a method of processing a script according to an embodiment of the present invention. In this particular embodiment, it is assumed that the command has been received over the interface between a host system and the storage device, and that the command is contained within the set of safe commands. Additionally, for the purpose of this flow diagram, a script interpreter is assumed to have already been loaded by the microprocessor of the storage device, and the following process is understood to occur entirely within the storage device.

A command input is received that invokes a safe interface command (block 500). In this instance, the particular command is a command for checking the age of an individual to verify that he or she is 21 years old. In pseudo-code, the command is "CheckAge(Name, Today)", which includes a name parameter and today's date.

The script interpreter begins execution of a script stored at the memory location associated with the received command "CheckAge( )" (step 502). The script interpreter selects a file on the person's name based on the name parameter (step 504). The script interpreter performs an update binary operation on the selected file (step 506). The script interpreter then reads binary on the date content of the selected file (e.g. birthdate) (step 508). The script interpreter performs an update binary operation on the date (step 510).

The script interpreter then processes a conditional function, which sets up two possible expectations: either the person is 21 years old or older, or the person is under age. If the date is greater than or equal to today minus 21 years (step 512), then return "yes" to the interface (step 514). If the date is less than 21 years, then return "no" to the interface (step 516).

In this example, if the "CheckAge" command were sent over the interface without the expected "Name" and "Today" (today's date) parameters, the command execution would have terminated upon discovery that the expected parameters were not provided (step 412 in FIG. 4). It should be understood that a script may contain functions for returning data to the interface or executing "safe" interface commands from the set of safe commands; however, such functions must be performed in an order that satisfies the parameter expectations and in an expected order. Otherwise, script execution will fail and changes are rolled back to the pre-execution state.

Figure 6:
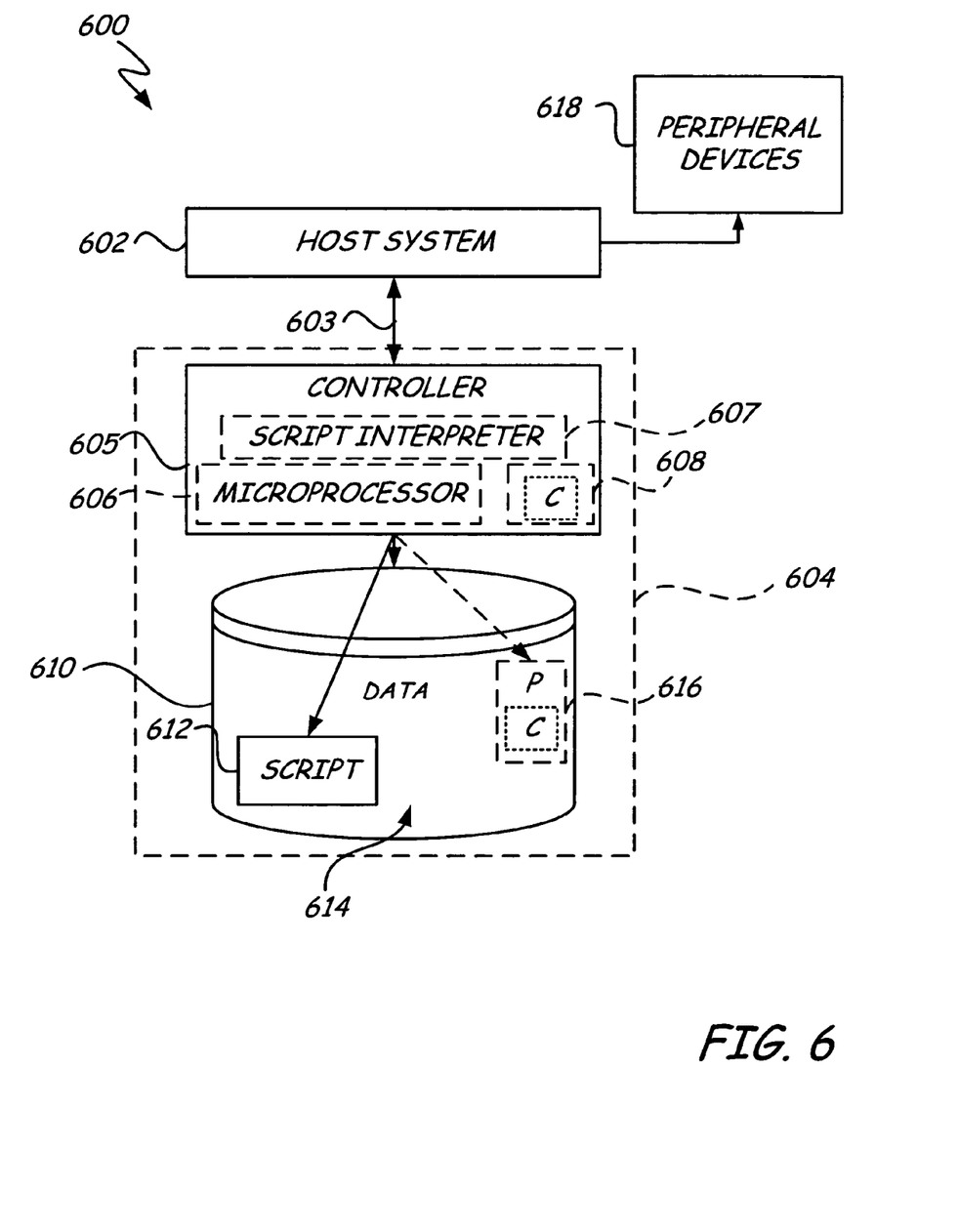
FIG. 6 is a simplified block diagram of a system implemented according to an embodiment of the present invention.

FIG. 6 illustrates a system 600 implemented according to an embodiment of the present invention. The system 600 includes a host system 602, which may be a personal computer or other processing device. The system 600 also includes a storage device 604 communicatively coupled to the host system 602 via interface 603. The storage device includes a controller 605 and a storage media 610. The controller 605 includes a microprocessor 606 and firmware 608. A script interpreter 607 is provided, which may be a run-time application to which the script is written, a set of procedures or rules to be enforced on the script by the microprocessor 606, or may be a circuit adapted to process the script. The storage medium 610 has a memory location 612 containing a script. The storage medium 610 may also be divided into a data area 614 and one or more security partitions 616. In one embodiment, the set of safe or allowed commands (C) is stored in the firmware 608 of the controller 605. In an alternative embodiment, the set of safe or allowed commands (C) is stored in a security partition 616 of the storage media 610.

In general, a security partition 616 is an area on the storage medium 610 to which access is tightly controlled. In one embodiment, only the controller 605 of the storage device 604 (or the microprocessor 606 or an application such as a script interpreter 607 operating in conjunction with controller 605) can access the security partition 616. Authorized users (or devices) which are identified (uniquely or by logical roles) in an authority table within the security partition 616 may be permitted limited access to data stored within the partition 616 via controller 605. In this way, the set of safe or allowable commands (C) can be maintained on the storage medium 610 without allowing changes to the command set.

In this embodiment, the script stored in memory location 612 in the data area 614 of the storage medium 610 is executed by an external device over the interface via a command or by attempting to access the memory location 612. The microprocessor 606 parses the script and accesses the set of commands (C) in the security partition 616 (or in firmware 608) in order to validate each command before executing it.

The script interpreter 607 may be stored in firmware 608 or may be stored in the data area 614 of the storage media 610, and loaded by the microprocessor 606 as needed. The script interpreter 607 generally operates in conjunction with firmware 608 and the microprocessor 606 similar to the manner in which a software application operates in conjunction with random access memory (RAM) and the microprocessor within a computing system.

As previously indicated, the commands may include conditional commands, which can permit two or more input commands to be expected simultaneously, where either command may succeed without the other necessarily succeeding (such as the IF-THEN-ELSEIF- . . . -ENDIF command). There is nevertheless a strict partial ordering of the commands that the scripting interpreter will handle.

In general, the script itself should be writeable to a storage location on the storage medium 614 of the storage device 604, and the script should be invoked by invoking the content of memory at that location. Moreover, the output of a script execution may include changes to stored data within the storage device, which would be reversed (undone or rolled back) upon script termination if the script is terminated before completion by the script interpreter. Alternatively, the output of a script may be written to one or more peripheral devices 618 via interface 603.

Figure 7:
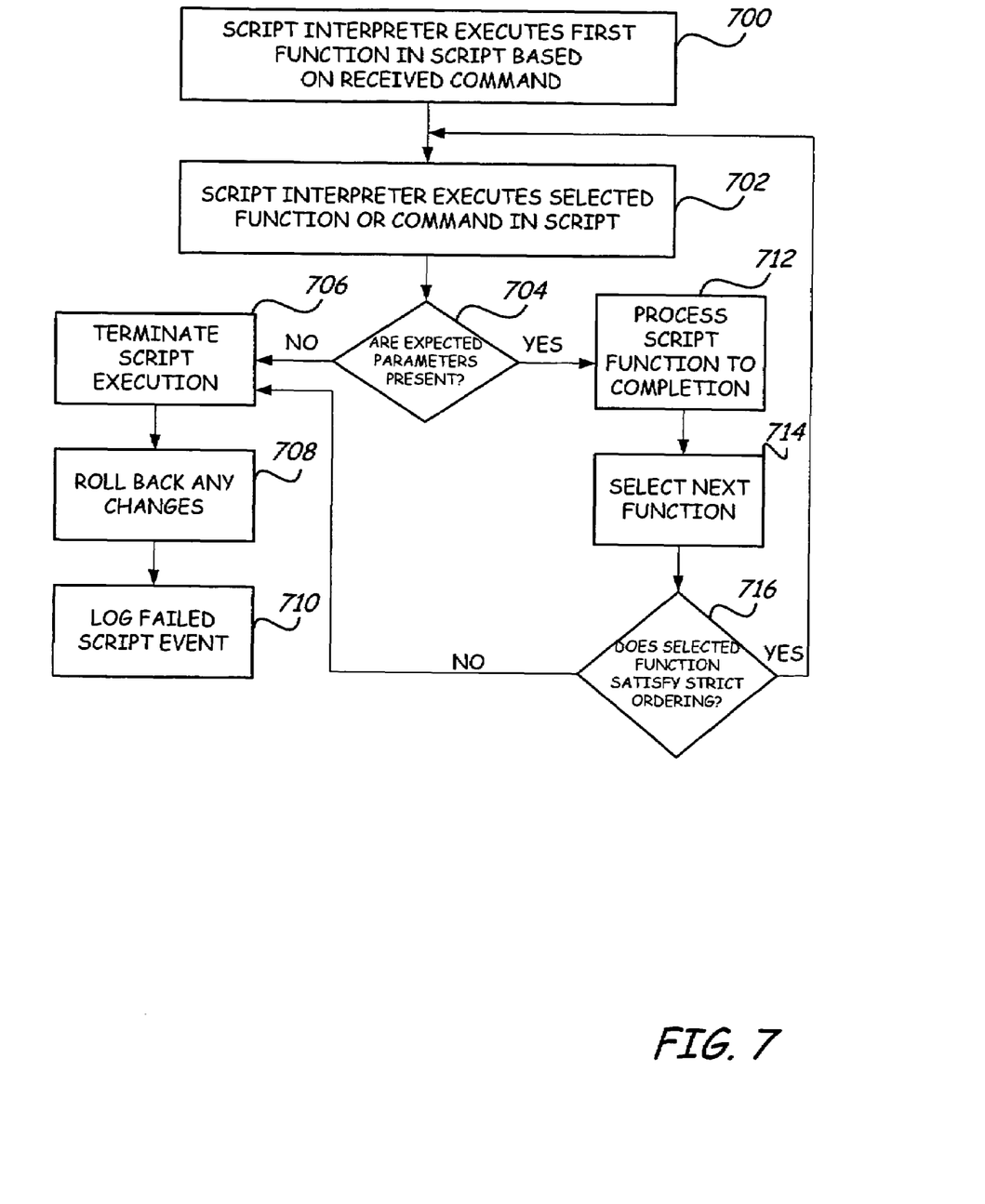
FIG. 7 is a simplified flow diagram of a method for processing a script with a script interpreter of a storage subsystem according to an embodiment of the present invention.

FIG. 7 is a simplified flow diagram of a method for managing script execution on a storage device according to an embodiment of the present invention. For the purpose of the flow diagram shown in FIG. 7, it is assumed that the storage device has received an input requesting access to content stored at a memory location on a storage media of the storage device, which contains a script for execution. The controller retrieves the contents (script) of the memory location and provides the contents to the microprocessor, which utilizes the script interpreter to process the retrieved script.

The script interpreter executes a first function in the script based on the received command (step 700). The first function may utilize one or more parameters associated with the received interface command. Assuming the first function is an internal function or a safe command from the set of safe commands, the script interpreter executes the selected function or command from the script (step 702). If expected parameters for the function or command are not present (step 704), the script interpreter terminates script execution (step 706), rolls back any script-based changes (step 708), and logs the failed script event in a security log (step 710). If expected parameters for the function or command are present (step 704), the script interpreter processes the script function to completion (step 712).

If the script includes more functions, the script interpreter selects a next function within the script (step 714). If the next selected script function does not satisfy strict ordering requirements of the system, the script execution is terminated (step 706). Script-related changes are rolled back or undone (step 708), and the failed script execution event is logged into an event log (step 710). If strict ordering is satisfied (step 716), steps 702 and sequence are repeated until all functions of the script have been processed or until the script fails.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the script handling storage system while maintaining substantially the same functionality without departing from the scope and spirit of the present invention. In addition, although the preferred embodiment described herein is directed to a methodology or system for managing scripts executed on a microprocessor of a storage subsystem such as a disc drive, it will be appreciated by those skilled in the art that the teachings of the present invention can be applied to control of script execution on any type of storage device, without departing from the scope and spirit of the present invention.

What is claimed is:

1. A system comprising:
   a removable data storage device comprising:
      a data storage medium;
      an interface adapted to communicatively couple the removable data storage device to a host system and to transport interface commands and information between the host system and the removable data storage device;
      a controller adapted to store data from the interface to the data storage medium and retrieve data from the data storage medium;
      a script interpreter within the removable data storage device and coupled to the controller for processing scripts within the removable data storage device based on one or more received interface commands, the script interpreter adapted to:
      enforce a strict ordering of script execution; and
      terminate script execution and undo any changes associated with the script execution if an interface command invokes a script in violation of the strict ordering.

2. The system of claim 1 wherein the script interpreter is within the controller.

3. The system of claim 1 further comprising a computer readable medium having instructions to cause a processor to execute a script, the instructions
   comprising data processing operations and logical functions that cannot be called directly from an interface command and that return no information to the interface.

4. The system of claim 2 wherein the script interpreter comprises:
   a software application utilized by the controller to process scripts within the removable data storage device.

5. The system of claim 3 wherein the script interpreter is adapted to enforce a strict partial ordering on execution of the operations and the functions within the storage device.

6. The system of claim 3 further comprising:
a security partition on the storage medium to which access is controlled by the controller, wherein the instructions for the operations and the functions are stored within the security partition and wherein the controller prohibits access to the instructions for the operations and the functions without authorization.

7. A script processing system comprising:
a removable data storage device comprising:
  a data storage medium;
  a controller adapted to read data from and write data to the data storage medium;
  a set of allowed commands stored within the data storage device, the set of allowed commands defining a strict set of input command expectations, interface commands, and internal functions; and
  a script interpreter within the controller adapted to execute scripts within the removable data storage device independent of the host system and to enforce the strict set of input command expectations within the storage device based on the set of allowed commands, the script interpreter adapted to terminate script execution if an input command expectation is violated.

8. The script processing system of claim 7 wherein the script interpreter is adapted to reverse any changes associated with script execution of a terminated script.

9. The script processing system of claim 7 wherein the script interpreter comprises:
  a script interpreter software application adapted to process scripts within a storage device; and
  a microprocessor adapted to load the script interpreter software application, process each command of a script against the set of permissible commands, and cause the script to fail when a command of the script does not match one of the set of permissible commands.

10. The script processing system of claim 7 wherein the data storage medium comprises a data area with one or more security partitions to which access is controlled by the controller within the storage device, wherein the set of allowable commands is stored on the data storage medium within at least one of the one or more security partitions.

11. The script processing system of claim 7 wherein the set of allowed commands further comprises:
  a subset of commands that execute only within a script environment for enabling logical operations within a script execution.

12. The script processing system of claim 11 wherein the subset of commands comprises a conditional branching command for making a decision based on two or more simultaneous inputs.

13. The script processing system of claim 7 wherein the set of allowed commands comprise commands with known inputs and outputs and performing operations that are known to be deterministic.

14. The system of claim 1 further comprising:
the host system coupled to the removable data storage device, the host system comprising:
  a memory containing instructions to execute an operating system;
  a host controller configured to execute the instructions to execute the operating system; and
  a host interface configured to allow the removable data storage device to be coupled to the host system;
  wherein the script interpreter within the removable storage device processes scripts within the removable data storage device independent from processing performed by the host system.

15. The system of claim 6 wherein the authorization is determined by the controller based on a list of authorized users identified in an authority table stored within the security partition.

16. The script processing system of claim 7 wherein the controller is further adapted to load a script from a memory location on the data storage medium, the script associated with a command received from a host system, and process the script with the script interpreter.

17. The script processing system of claim 16 wherein the controller is further adapted to:
  impose an expectation on the command by requiring one or more input parameters based on the loaded script;
  terminate script execution when input parameters of the command do not match the one or more required input parameters; and
  undo any changes associated with the script execution to a pre-script execution state when input parameters of the received command do not match.

18. The script processing system of claim 17 wherein the controller is further adapted to enforce a strict command sequence defined by the script and terminate execution of the script when a violation of the strict command sequence is detected.

19. The script processing system of claim 18 further comprising:
the host system coupled to the removable data storage device, the host system comprising:
  a memory containing instructions to execute an operating system;
  a host controller configured to execute the instructions to execute the operating system; and
  a host interface configured to allow the removable data storage device to be coupled to the host system.

* * * * *

UNITED STATES PATENT AND TRADEMARK OFFICE
CERTIFICATE OF CORRECTION

PATENT NO. : 7,631,198 B2  Page 1 of 1
APPLICATION NO. : 11/125861
DATED : December 8, 2009
INVENTOR(S) : Robert Thibadeau It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1072 days.

Signed and Sealed this

Second Day of November, 2010

David J. Kappos
*Director of the United States Patent and Trademark Office*